United States Patent
Cai et al.

(10) Patent No.: US 10,012,402 B2
(45) Date of Patent: Jul. 3, 2018

(54) TOP-FILL HUMIDIFIER

(71) Applicant: FOSHAN JINXINGHUI ELECTRICAL APPLIANCE CO., LTD., Foshan, Guangdong Province (CN)

(72) Inventors: Jingbo Cai, Foshan (CN); Xiong Yang, Foshan (CN)

(73) Assignee: FOSHAN JINXINGHUI ELECTRICAL APPLIANCE CO., LTD., Foshan (CN)

( * ) Notice: Subject to any disclaimer, the term of this patent is extended or adjusted under 35 U.S.C. 154(b) by 238 days.

(21) Appl. No.: 15/172,504

(22) Filed: Jun. 3, 2016

(65) Prior Publication Data

US 2016/0356514 A1    Dec. 8, 2016

(30) Foreign Application Priority Data

Jun. 5, 2015    (CN) .................... 2015 2 0380986 U

(51) Int. Cl.
| | |
|---|---|
| *F24F 6/14* | (2006.01) |
| *F24F 13/20* | (2006.01) |
| *F24F 11/00* | (2018.01) |
| *F24F 6/00* | (2006.01) |

(52) U.S. Cl.
CPC ............ *F24F 6/14* (2013.01); *F24F 11/0008* (2013.01); *F24F 13/20* (2013.01); *F24F 2006/008* (2013.01); *F24F 2006/143* (2013.01); *Y02B 30/545* (2013.01)

(58) Field of Classification Search
CPC ................ B01F 3/04056; B01F 3/0407; B01F 2215/0091; F24F 6/14; F24F 11/0008; F24F 13/20; F24F 2006/008; F24F 2006/143; Y02B 30/545
USPC .............. 261/30, 72.1, 81, 84, 115, DIG. 65
See application file for complete search history.

(56) References Cited

U.S. PATENT DOCUMENTS

| | | | | |
|---|---|---|---|---|
| 3,587,968 A | * | 6/1971 | Hennart et al. | A61L 9/12 239/309 |
| 5,000,383 A | * | 3/1991 | van der Heijden | A01M 1/2044 239/44 |
| 5,792,390 A | * | 8/1998 | Marino | F24F 6/00 215/359 |
| 6,592,107 B1 | * | 7/2003 | Wong | F24F 6/02 261/107 |
| 7,234,690 B2 | * | 6/2007 | Campbell | F24F 6/02 261/119.1 |

(Continued)

FOREIGN PATENT DOCUMENTS

CN    203190554 U    9/2013

*Primary Examiner* — Charles Bushey
(74) *Attorney, Agent, or Firm* — Leason Ellis LLP

(57) ABSTRACT

Disclosed is a top-fill humidifier easy to wash and without water leakage. The humidifier comprises a single-piece body having a hollow chamber with a wall and bottom; and an isolator removably assembled in the chamber to divide the chamber into a storage sub-chamber between the isolator and the wall of the chamber and a vaporizing sub-chamber between the isolator and the bottom of the chamber. In such a humidifier, the isolator divides the chamber in the body into a storage chamber and a vaporizing chamber, which may solve the problem of water leakage and facilitate the washing of the humidifier.

19 Claims, 4 Drawing Sheets

(56) References Cited

U.S. PATENT DOCUMENTS

| | | | |
|---|---|---|---|
| 7,547,004 B2* | 6/2009 | Hsu | F24F 6/02 |
| | | | 261/104 |
| 8,821,368 B2* | 9/2014 | Khodak | A61G 11/00 |
| | | | 600/22 |
| 8,827,247 B2* | 9/2014 | Kanel | F24F 6/02 |
| | | | 261/29 |
| 9,776,144 B1* | 10/2017 | Lu | F24F 6/12 |
| 2015/0076716 A1* | 3/2015 | Roemburg | B05B 17/0646 |
| | | | 261/78.2 |

* cited by examiner

000
TOP-FILL HUMIDIFIER

TECHNICAL FIELD

The present application relates to a humidifier, in particular, to a top-fill humidifier.

BACKGROUND

With the improvement of living conditions, there is an increasingly need for more comfortable living environment. Air humidity is an important factor influencing the comfort. Especially, in dry regions and in air-conditioned places, the humidifier becomes an indispensable home appliance in many families.

Currently, most of the humidifiers on the market have a separate water tank with a filling inlet provided at the bottom of the water tank. When a user fills a bottom-fill humidifier, he first lifts the water tank by holding a handle, turns over the water tank to orient the bottom of the water tank upward, opens the fill lid at the bottom of the water tank, fills the water tank, and then closes the fill lid. The overall filling operation is complex, and the filled water tank may be too heavy for not so strong users, such as the elderly, women.

To solve the problem, the Chinese utility model application CN203190554U discloses a top-fill humidifier. The top-fill humidifier includes a base, a water tank and a cap. The base includes a sink. The water tank includes a vapor channel, and a nozzle at the top of the water tank. The nozzle communicates with the vapor channel. The water tank further includes a bottom with a draining outlet. A draining device is installed on the draining outlet. A water level controlling device for controlling switch-on/off of the draining device based on a water level in the sink is installed in the sink. This top-fill humidifier uses the draining device and the water level controlling device to control the water level in the sink automatically. During the filling, the cap can be removed or capped, which facilitates the operation. However, there is a disadvantage for such a top-fill humidifier. The water tank of the top-fill humidifier is supported above the base in order to facilitate washing the sink. That is, the water tank and the base are separate from each other and sealed with each other by using a seal ring. When the sink of the base is to be washed, the water tank must be removed from the base. Once the water level controlling device or the seal ring becomes defective during the use of the humidifier, water in the water tank will leak into the sink and spill out of the machine through the gap between the water tank and the base, damages the machine and floods the surrounding.

Moreover, humidifiers in the prior art still have a problem that water or vapor may flow backward into a blower through an air duct, causing damage to the blower.

SUMMARY

According to an aspect of the present application, it is to provide a top-fill humidifier easy to wash and without water leakage.

The top-fill humidifier comprises a body, the body having a chamber with an opening, the chamber having a vaporizer, the body having a blower with a first outlet, and an air duct communicating with the first outlet, the air duct having a second outlet; an isolator located in the chamber and sealed and removably assembled with the chamber, the isolator dividing the chamber into a vaporizing chamber and a storage chamber, the vaporizer being located in the vaporizing chamber having a spray outlet communicating with the second outlet, the storage chamber having a draining outlet communicating with the vaporizing chamber, a draining device mounted at the draining outlet; and a water level controlling device for controlling switch-on/off of the draining device based on a water level in the vaporizing chamber.

During the use of the humidifier, the storage chamber can be filled with water through the opening of the chamber so that the function of top-fill is accomplished. The vapor generated in the vaporizing chamber is sprayed out of the vapor outlet under the effect of the air from the air duct, so as to accomplish the function of humidifying. If the sealing between the isolator and the body is defective due to impurities in water or another reason, the water in the storage chamber will irrigate into the vaporizing chamber. Since both of the storage chamber and the vaporizing chamber are formed within the body, the water will not spill out of the top of the body. There is no gap on the body, which may accomplish the function of preventing water leakage. The structure of the draining outlet, the draining device, and the water level controlling device can be known from the Chinese application CN203190554U. The detailed description of them will be omitted.

Further, according to the present application, the isolator is sealed and removably assembled with the chamber. Thus, after the use of the humidifier for a while, the isolator can be removed so that the vaporizing chamber can be washed. There are several manners for sealing and connecting, for example, fitting with a clip and seal, fitting with a spring and seal, fitting with a screw and seal, interference fitting, and so on. According to an embodiment of the present application, the following manner is adopted.

The chamber has a bottom with a concave surrounded by a step. The vaporizer is located in the concave, and the isolator comprises an assembling base sealed and removably connected with the step, and a vapor barrel embracing the air duct. The vapor outlet is located on the vapor barrel. Specifically, the assembling base can be fitted to the step in a manner of using a thread and seal. In such a structure, the step is used to form the concave at the bottom of the chamber. The vaporizer can be installed in the concave so that the vaporizer can be avoided from contacting the isolator. After the assembly of the isolator with the body, a storage chamber is formed between the isolator and the sidewall of the chamber of the body, and a vaporizing chamber is formed between the interior of the isolator and the bottom of the chamber of the body. The chamber within the body can be washed by disassembling the isolator. The structure of the fitting by using a thread and seal is similar to that of a bottom-fill humidifier in prior art. The detailed description of it will be omitted.

If the outlet of the air duct is connected to the vaporizing chamber directly, the outlet of the air duct must be located low. Otherwise, the air from the air duct will flow out of the vapor outlet directly, and the vapor will be pushed downward and cannot flow out. However, with a low outlet of the air duct, the water in the vaporizing chamber may drop into the air duct through the outlet of the air duct. To solve this problem, an embodiment of the present application provides the following structure. The isolator is provided with an air guiding structure guiding air from the outlet of the air duct to a middle or bottom of the isolator. The air from the blower and through the air duct enters downward into the middle part or lower part of the vapor outlet chamber. Then, the air pressure in the vapor outlet chamber is increased so that the vapor in the vapor outlet chamber can be pushed out of the vapor outlet. In this way, with the vaporizing function, the height of the outlet of the air duct is increased, and the possibility of water entering into the air duct is decreased.

Specifically, the air guiding structure comprises an air outlet chamber communicating with a vapor outlet chamber at a bottom, the second outlet is located in the air outlet chamber, and a top of the vapor outlet chamber is in communication with the vapor outlet. The air exhausted from the blower through the air duct enters the air outlet chamber, reaches the middle or upper middle of the vaporizing chamber downward along the sidewall of the air outlet chamber, and then enters into the vapor outlet chamber, which increases the air pressure in the vapor outlet chamber so as to push the vapor in the vaporizing chamber out of the nozzle.

Further, the air duct is provided with a drain outlet under the outlet of the blower, and the drain outlet is communicated with an exterior of the body. Since the drain outlet is set below the outlet of the blower, water will be drained through the drain outlet even if water enters into the air duct for some reason, but water will not enter into the blower, thus protecting the blower.

With the restriction of the manufacture process and structure, the sealing between the drain outlet of the air duct and the body may not be good enough. Sometimes, water from the air duct may leak in the body. To solve this problem, an embodiment of the present application provides the following structure. The air duct is provided with a drain outlet under the first outlet, the body is provided with a water tank under the drain outlet of the air duct, and the water tank has a drain outlet communicating with an exterior of the body. Water from the drain outlet of the air duct will drop into the water tank, and then drain out of the body through the drain outlet of the water tank. In this way, the sealing degree between the drain outlet of the air duct and the body can be decreased, and the water from the air duct may not flow in the body unexpectedly, thus protecting the electrical components.

Further, in order to increase the efficiency of the blower, the air duct is provided with an air guiding slope or arc facing the first outlet. The guiding slope or arc is able to guide the air from the blower upward to the outlet at the top of the air duct, so as to decrease the air amount leaked from the drain outlet.

Further, in order to facilitate the washing and installation, the draining outlet, the draining device, and the water level controlling device are fixedly installed to the isolator, in particularly, to the assembling base of the isolator.

Further, for the purpose of aesthetics and safety, the top-fill humidifier includes a cap mounted over the chamber. The cap has a through hole which the isolator protrudes, or has a nozzle connected with the vapor outlet.

According to the present application, the conventional water storage reservoir separate from the base is replaced with an isolator dividing the chamber into a storage chamber having the function of a conventional water reservoir and a vaporizing chamber. This design may save the cost, solve the problem of water leakage, facilitate the washing, and be more practical and commercial.

DETAILED DESCRIPTION OF EMBODIMENTS

Hereinafter, a detailed description of the present application will be given with reference to the appended drawings.

Figure 1:
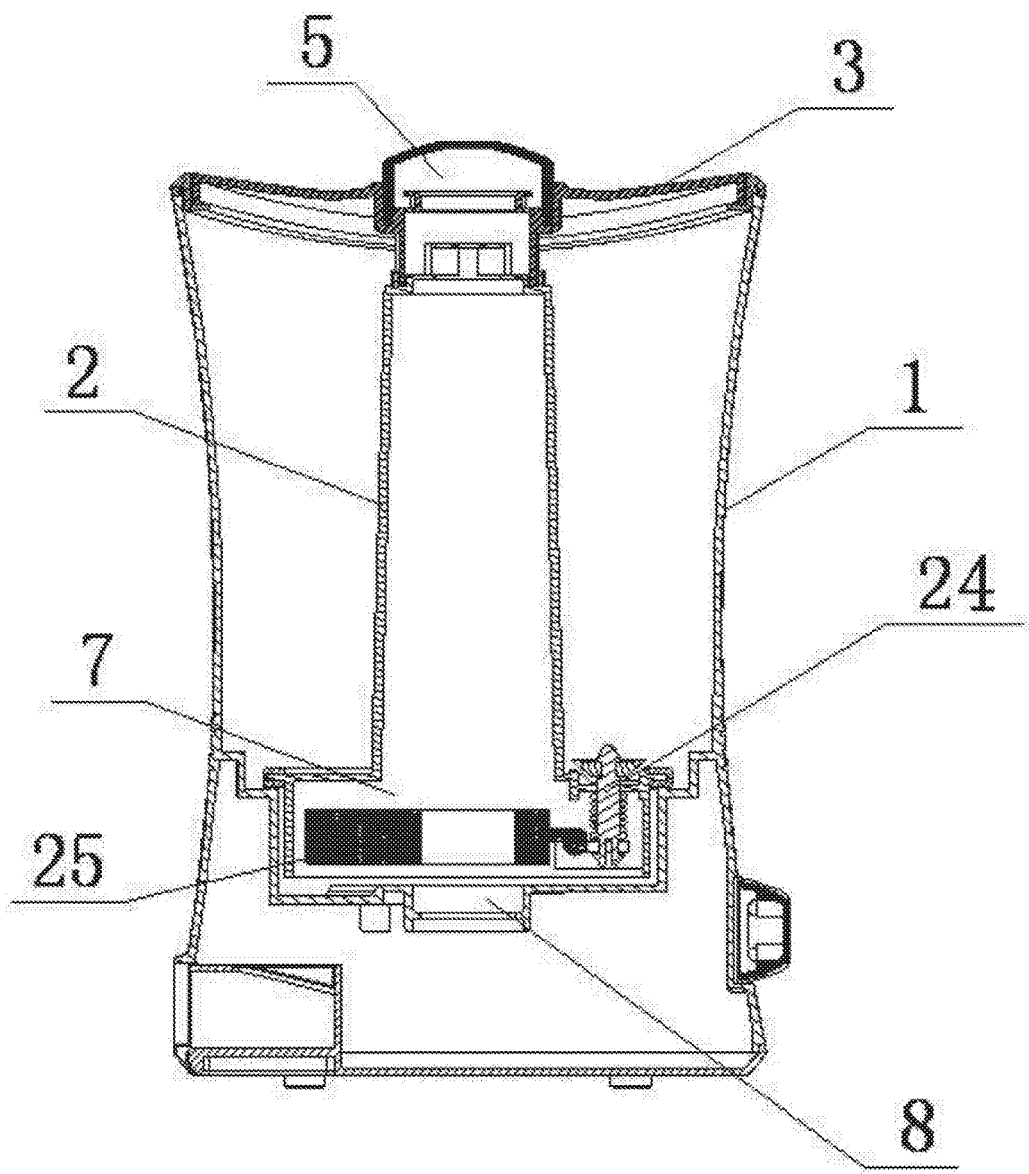
FIG. 1 illustrates the schematic of a cross sectional of the top-fill humidifier according to an embodiment of the present application.
Figure 2:
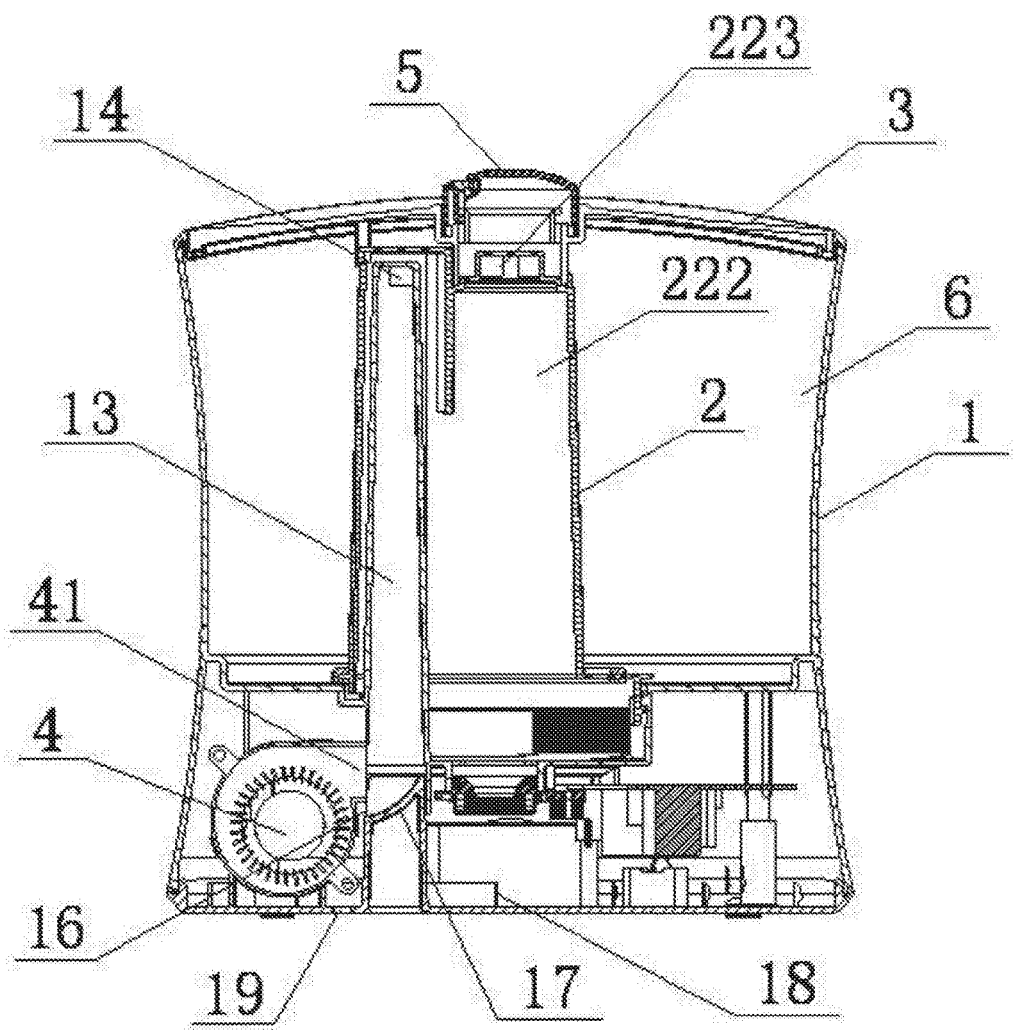
FIG. 2 illustrates the schematic of another cross sectional of the top-fill humidifier according to an embodiment of the present application, with a direction perpendicular to that of FIG. 1.
Figure 3:
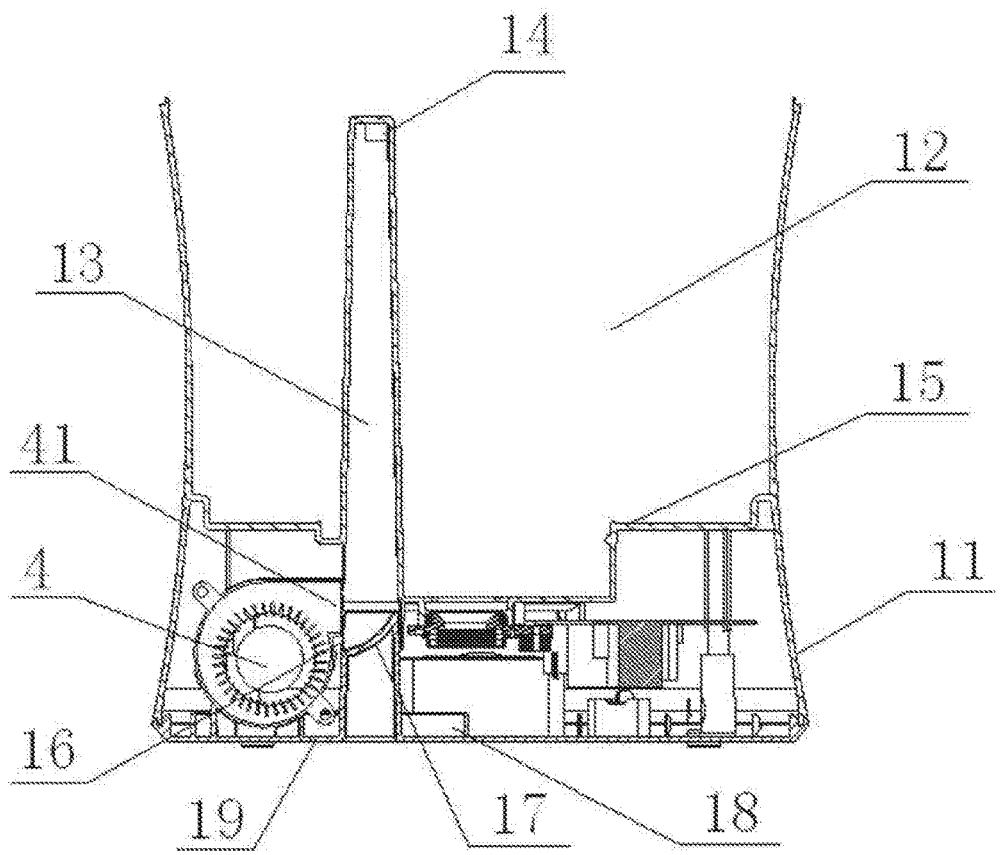
FIG. 3 illustrates the schematic of a cross sectional of the body according to an embodiment of the present application.
Figure 4:
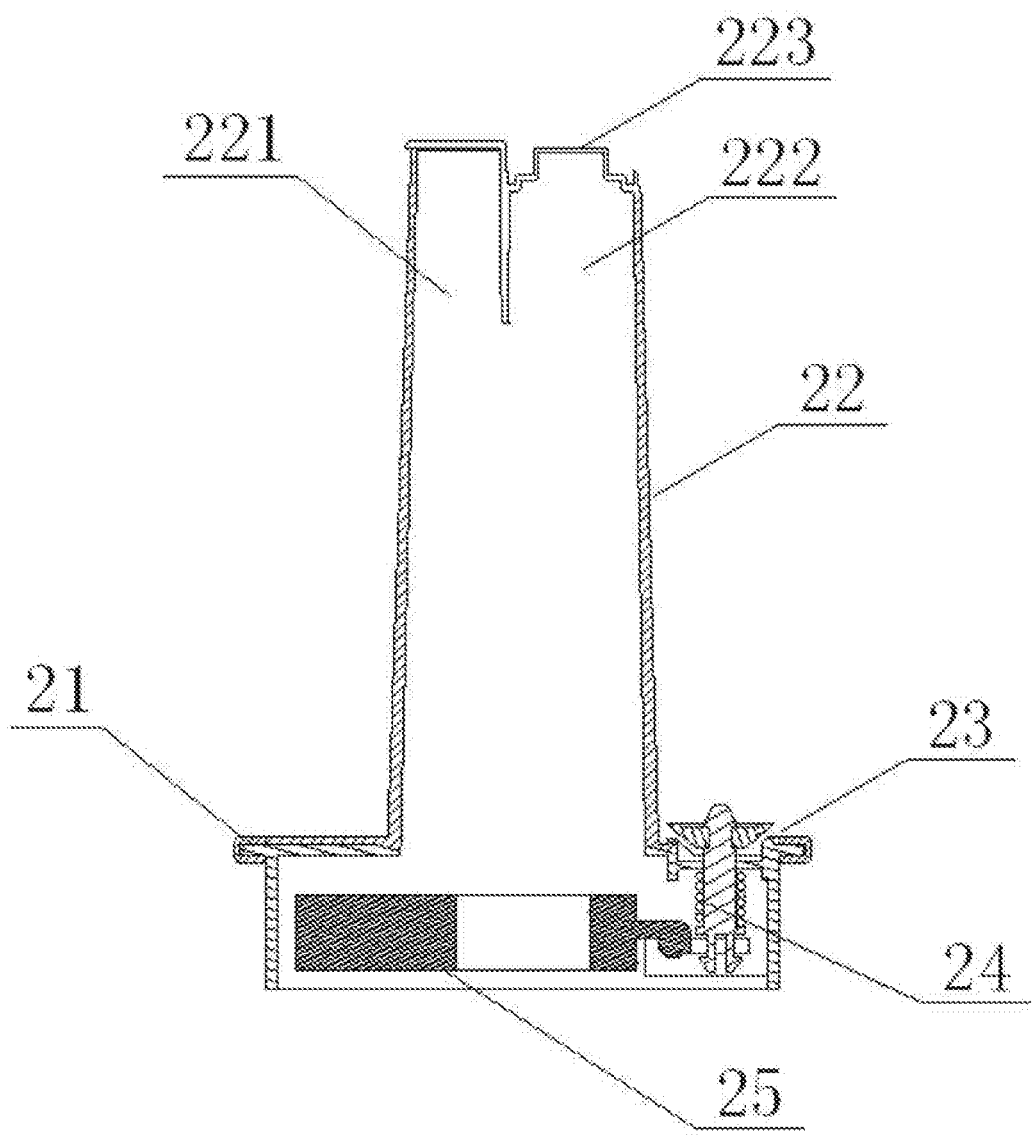
FIG. 4 illustrates the schematic of a cross sectional of the isolator according to an embodiment of the present application.

As illustrated in FIGS. 1-4, the top-fill humidifier according to an embodiment of the present application includes a body 1, an isolator 2, and a cap 3. Each of the body 1, isolator 2, and cap 3 is an integral plastic. The body 1 has a base 11 at the bottom. A blower 4 and other electrical components are installed within the base 11. The edge of the base 11 extends upward to form a chamber 12 having a top opening. The cap 3 covers the chamber 12. The blower 4 is installed in the base 11, and an air duct 13 extends upward from the base 11. The bottom of the air duct 13 communicates with the outlet 41 of the blower 4. The air duct 13 has an outlet 14 at the top. The cap 3 has a nozzle 5.

The chamber has a bottom with a concave surrounded by an annular step 15. The isolator 2 includes an assembling base 21 and a vapor barrel 22. The assembling base 21 is provided on the step 15 with the bottom periphery of the assembling base 21 connecting to the step 15 in a removable manner of sealing by using a thread and seal. The air duct 13 is surrounded by the vapor barrel 22, which has a vapor outlet 223 connecting with the nozzle 5 in a sealed fashion, at the top of the vapor barrel 22. After the assembly of the isolator 2 with the body 1, a storage chamber 6 is formed between the assembling base 21 of the isolator 2, the vapor barrel 22 and the sidewall of the chamber 12 of the body 1. A vaporizing chamber 7 is formed between the assembling base 21 of the isolator 2 and the bottom of the chamber 12 of the body 1. The vapor outlet 223 at the top of the vapor barrel 22 connects with the nozzle 5 in a sealed manner to prevent water from coming into the interior of the isolator 2 when the chamber is filled with excessive water.

The vapor barrel 22 has a top with an air outlet chamber 221 and a vapor outlet chamber 222. The outlet 14 of the air duct 13 is located within the air outlet chamber. The top of the vapor outlet chamber 222 communicates with the vapor outlet 223, and the bottom of the air outlet chamber 221 communicates with that of the vapor outlet chamber 222. The air exhausted from the blower 4 through the air duct 13 enters the air outlet chamber 221, reaches the middle of the vapor barrel 22 downward along the sidewall of the air outlet chamber 221, and then enters into the vapor outlet chamber 222 upward, which increases the air pressure in the vapor outlet chamber 222 so as to push the vapor in the vapor barrel 22 out of the nozzle 5. Thus, with the vaporizing function, the height of the outlet 14 of the air duct 13 is increased, and the possibility of water entering into the air duct 13 is decreased.

The bottom of the air duct 13 is connected with the outlet 41 of the blower 4, and is provided with a drain outlet 16 below the outlet 41 of the blower 4. The base 11 has a water tank 18 under the drain outlet 16. The water tank 18 has a drain outlet 19 communicating with the exterior of the body 1. Since the drain outlet 16 is set below the outlet 41 of the blower, water will drop into the water tank 18 from the drain outlet 16 and drain through the drain outlet 19 even if water enters into the air duct 13 for some reason, but water will not enter into the blower 4, thus protecting the blower 4.

To improve the efficiency of the blower 4, the bottom of the air duct 13 has a guiding arc 17 facing the outlet 41 of the blower 4. The drain outlet 16 is located at the bottom of the guiding arc 17. The guiding arc 17 is able to guide the air from the blower 4 upward to the outlet 14 at the top of the air duct 13, so as to decrease the air amount leaked from the drain outlet 16.

The assembling base 21 of the isolator 2 has a draining outlet 23 communicating with the vaporizing chamber 7. A draining device 24 is installed on the draining outlet 23. A water level controlling device 25 for controlling switch-on/off of the draining device 24 based on the water level in the vaporizing chamber 7 is installed in the assembling base 21 of the isolator 2, and an ultrasonic vaporizer 8 is installed in the vaporizing chamber 7. Specifically, the ultrasonic vaporizer 8 is installed in the concave surrounded by the annular step 15.

During the use of the humidifier, the storage chamber 6 can be filled with water by opening the cap 3 so that the function of top-fill is accomplished. After the use of the humidifier, the isolator 2 can be removed so that the interior of the vaporizing chamber 7 and the chamber 12 can be washed. If the sealing between the isolator 2 and the body 1 is defective due to impurities in water or other reasons, the water in the storage chamber 6 will irrigate into the vaporizing chamber 7. Since both the storage chamber 6 and the vaporizing chamber 7 are formed within the body 1, the water will not spill out of the top of the body 1. There is no gap on the chamber 12 of the body 1, thus preventing water leakage.

Although the above descriptions include many specific arrangements and parameters, it should be noted that these specific arrangements and parameters only served to illustrate one embodiment of the present application. This should not be considered as the limitations on the scope of the application. It can be understood by those skilled in the art that various modifications, additions and substitutions may be made thereto without departing from the scope and spirit of the present application. Therefore, the scope of the present application should be construed on the basis of the appended claims.

What is claimed is:

1. A top-fill humidifier, comprising:
a body, the body having a chamber with an opening, the chamber having a vaporizer, the body having a blower with a first outlet, and an air duct communicating with the first outlet, the air duct having a second outlet;
an isolator located in the chamber and sealed and removably assembled with the chamber, the isolator dividing the chamber into a vaporizing chamber and a storage chamber, the vaporizer being located in the vaporizing chamber having a spray outlet communicating with the second outlet, the storage chamber having a draining outlet communicating with the vaporizing chamber, a draining device mounted at the draining outlet; and
a water level controlling device for controlling switch-on/off of the draining device based on a water level in the vaporizing chamber.

2. The top-fill humidifier of claim 1, wherein
the chamber has a bottom with a concave surrounded by a step, the vaporizer is located in the concave, the isolator comprises an assembling base sealed and removably connected with the step, and a vapor barrel embracing the air duct, and
the vapor outlet is located on the vapor barrel.

3. The top-fill humidifier of claim 1, wherein the isolator is provided with an air guiding structure guiding air from the outlet of the air duct to a middle or bottom of the isolator.

4. The top-fill humidifier of claim 3, wherein the air guiding structure comprises an air outlet chamber communicating with a vapor outlet chamber at a bottom, the second outlet is located in the air outlet chamber, and a top of the vapor outlet chamber is in communication with the vapor outlet.

5. The top-fill humidifier of claim 4, wherein the air outlet chamber and the vapor outlet chamber are located at a top of the vapor barrel of the isolator, and each of the air outlet chamber and the vapor outlet chamber comprises a downward opening.

6. The top-fill humidifier of claim 1, wherein the air duct is provided with a drain outlet under the outlet of the blower, and the drain outlet is communicated with an exterior of the body.

7. The top-fill humidifier of claim 1, wherein the air duct is provided with a drain outlet under the first outlet, the body is provided with a water tank under the drain outlet of the air duct, and the water tank has a drain outlet communicating with an exterior of the body.

8. The top-fill humidifier of claim 6, wherein the air duct is provided with an air guiding slope or arc facing the first outlet.

9. The top-fill humidifier of claim 1, wherein the draining outlet, the draining device, and the water level controlling device are fixedly installed to the isolator.

10. The top-fill humidifier of claim 1, further comprising a cap mounted over the chamber, wherein
the cap has a through hole, the isolator protrudes the through hole, or
the cap has a nozzle connected with the vapor outlet.

11. A humidifier comprising:
a single-piece body having a hollow chamber with a wall and bottom; and
an isolator removably assembled in the chamber to divide the chamber into a storage sub-chamber between the isolator and the wall of the chamber and a vaporizing sub-chamber between the isolator and the bottom of the chamber.

12. The humidifier of claim 11, wherein the body comprises a step provided on the wall and surrounding a central portion of the hollow chamber, and the isolator comprises a base removably assembled and sealed with the step.

13. The humidifier of claim 12, wherein the step is annular, and an outer surface of the base is removably assembled with an inner surface of the step.

14. The humidifier of claim 11, further comprising:
a blower located within the vaporizing sub-chamber; and
an air duct communicating with the blower, wherein the isolator comprises a vapor barrel into which the air duct extends.

15. The humidifier of claim 14, wherein an upper portion of the vapor barrel comprises an air outlet part and a vapor outlet part having a partition wall therebetween, the partition wall extends downward from a top of the vapor barrel and ends in a space of the vapor barrel, the air duct extends into the air outlet part, and the vapor outlet part has a vapor outlet on the top of the vapor barrel.

16. The humidifier of claim 15, further comprising:
a cap covering the chamber removably and having a nozzle communicated with the vapor outlet.

17. The humidifier of claim 14, wherein a drain outlet is provided at a bottom of the air duct and under an outlet of the blower.

18. The humidifier of claim 14, wherein an air guiding structure is provided at a bottom of the air duct to guide air from the blower upward to the air duct.

19. The humidifier of claim 12, wherein the base comprises a draining outlet, the humidifier further comprises a draining device provided at the draining outlet and a water level controlling device located in the vaporizing sub-chamber to control switch-on/off of the draining device.

* * * * *